April 6, 1937. H. H. RICHTER 2,076,208
FREEZING TRAY
Filed May 18, 1936
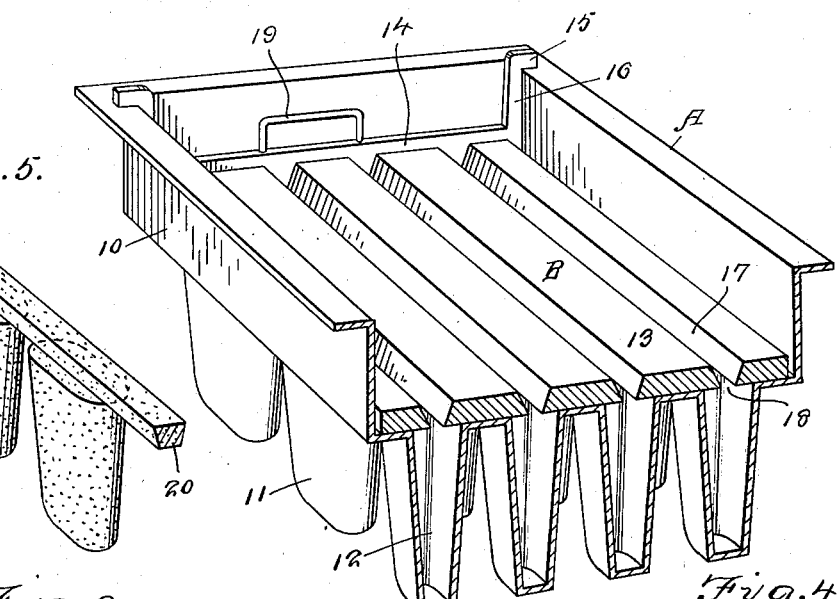
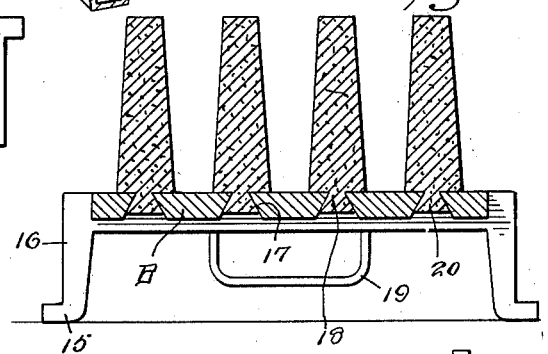
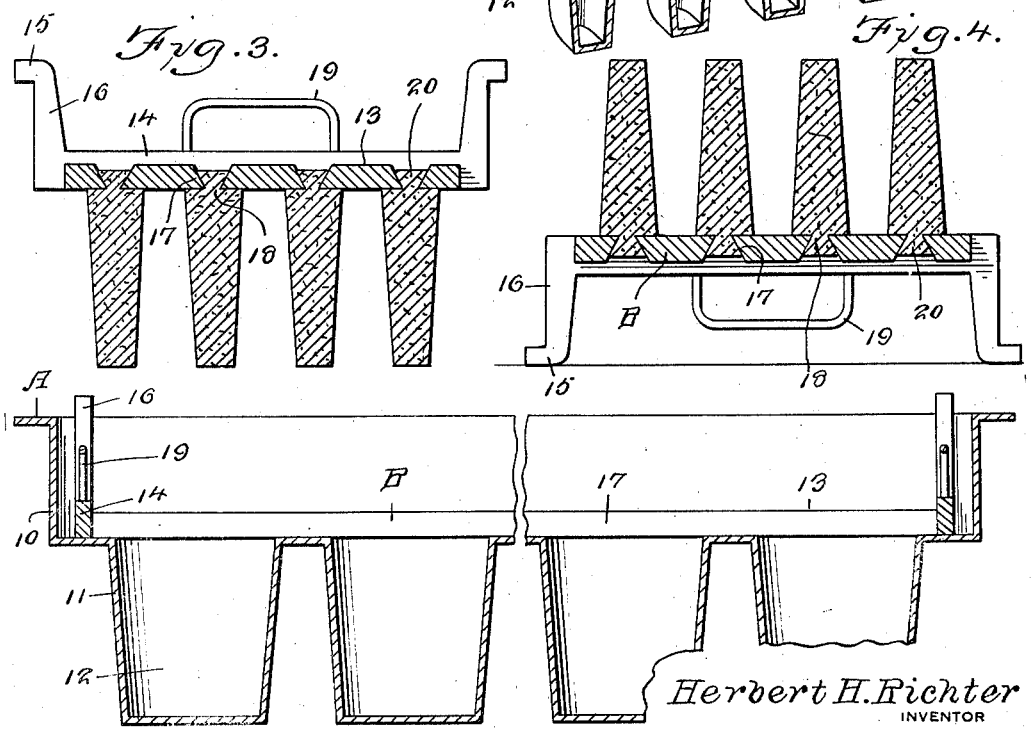
Herbert H. Richter
INVENTOR
BY Victor J. Evans & Co.
ATTORNEY Patented Apr. 6, 1937

2,076,208

UNITED STATES PATENT OFFICE 2,076,208

FREEZING TRAY

Herbert H. Richter, Houston, Tex.

Application May 18, 1936, Serial No. 80,426

3 Claims. (Cl. 62—108.5)

The invention relates to a combined tray and contents extractor and more especially to a freezing tray contents extractor.

The primary object of the invention is the provision of a device of this character wherein on filling of a freezing tray for a refrigerator of the ice-making machine type, the contents of such tray when frozen can be readily and easily removed therefrom or extracted without inconvenience and with ease.

Another object of the invention is the provision of a device of this character wherein the construction thereof is novel in form so that a frozen confection within a freezing tray of a refrigerator can be conveniently withdrawn without disturbing the shape of such frozen content and without exerting excessive labor for so doing.

A further object of the invention is the provision of a device of this character which is simple in its construction, thoroughly reliable and efficient in its operation, readily and easily applied to and removed from a freezing tray of a refrigerator for the purpose of extracting the frozen content of such tray, strong, durable and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is a fragmentary perspective view of a tray for use in a refrigerator showing the device constructed in accordance with the invention applied thereto.

Figure 2 is a disrupted enlarged vertical section view through the tray and device.

Figure 3 is a vertical transfer sectional view through the device showing a frozen substance held thereby after extraction or removal from the tray.

Figure 4 is a view similar to Figure 3 showing the device inverted.

Figure 5 is a fragmentary perspective view of the frozen substance.

Similar reference characters indicate corresponding parts throughout the several views in the drawing.

Referring to the drawing in detail, A designates generally a portion of a freezing tray for a refrigerator of the ice-making type and B the device for the removal or extracting of the content of the tray after freezing. The tray comprises a walled substantially rectangular shaped body 10 open at its top and having formed at its bottom a plurality of downwardly tapered substantially oval-shaped hollow projections 11, thus forming pockets or cells 12 which open upwardly into the body 10 of the tray A and are uniformly spaced from each other in rows longitudinally disposed of said tray. The liquid to be frozen is poured into the body of the tray A filling the pockets 12 and such tray is held within the freezing compartment of a refrigerator (not shown) which latter is of the brine tank type.

The device B is in the form of a rack including a plurality of spaced parallel slats 13 between and joined with substantially U-shaped end frames 14, these having outturned hanger ears 15 formed at the upper ends of the side limbs 16 of said frames. The slats 13 are flat at their top and bottom faces and have reversely beveled side edges 17, walling the spaces 18 between said slats. The spaces 18 are registered with the pockets or cells 13 when the rack is within the tray A. This rack is placed within the tray before pouring the liquid thereinto and will not check the flow of liquid into the pockets or cells 12 when poured within said tray.

Intermediate of the end frames 14 are upstanding bail handles 19 which aid in the lifting of the rack from within the tray A after the liquid content of the latter has become frozen. It is, of course, understood that when pouring the liquid into the tray A such liquid should rise to a level from within the pockets or cells 12 approximately to the plane of the uppermost outside faces of the slats 13 of said rack, so that when freezing of the liquid takes place, there will be a dovetailed union at 20 between the frozen content of the said tray A and the rack. Thus this dovetailed connection 20 permits the convenient extraction of the frozen substance when the rack is pulled from the tray A, removing as a unit the frozen content of the tray and the portions of said content as within the pockets or cells 12. After the rack has been removed, it can be inverted and brought to rest upon a support shown in Figure 4 of the drawing, thus holding the frozen substance intact and in a moulded condition. Thus portions of the frozen content as moulded by the pockets or cells 12 of the tray can be conveniently broken off for consumption.

The device is adaptable for use when freezing confections of a liquid kind.

When the device is inverted as shown in Figure 4 of the drawing, side limbs 16 function as legs therefor.

While the device has been heretofore described for use in household mechanical refrigerators, it is of course to be understood that such device is adaptable for trays made for freezing in a brine tank such as those employed in ice-cream factories, the device being also serviceable for use in hardening rooms of factories producing water ices, frozen confections, etc., it being only necessary to fill the pockets to the top of such pockets and under expansion the frozen substance will freeze through the spaces sufficiently strong to permit the pulling of the ice content of the tray therefrom.

What is claimed is:

1. The combination of a tray having pockets in its bottom and fully open at its top, a flat rack fitting said tray and having slats spaced from each other to provide slots registering with the pockets in the bottom of said tray and end pieces for said rack, the edges of the slats at the slots therebetween being reversely beveled.

2. The combination of a tray having pockets in its bottom and fully open at its top, a flat rack fitting said tray and having slats spaced from each other to provide slots registering with the pockets in the bottom of said tray, end pieces for said rack, the edges of the slats at the slots therebetween being reversely beveled, and legs formed on said end pieces and having feet.

3. The combination of a tray having pockets in its bottom and fully open at its top, a flat rack fitting said tray and having slats spaced from each other to provide slots registering with the pockets in the bottom of said tray, end pieces for said rack, the edges of the slats at the slots therebetween being reversely beveled, and legs formed on said end pieces and having feet, the pockets in the tray being outwardly tapered.

HERBERT H. RICHTER.